(12) United States Patent
Dawson

(10) Patent No.: US 6,987,518 B2
(45) Date of Patent: Jan. 17, 2006

(54) GRAPHICS AND VIDEO INTEGRATION WITH ALPHA AND VIDEO BLENDING

(75) Inventor: Thomas Patrick Dawson, Escondido, CA (US)

(73) Assignees: Sony Corporation, Tokyo (JP); Sony Electronics Inc., NJ (US)

( * ) Notice: Subject to any disclaimer, the term of this patent is extended or adjusted under 35 U.S.C. 154(b) by 0 days.

(21) Appl. No.: 10/875,562

(22) Filed: Jun. 24, 2004

(65) Prior Publication Data

US 2004/0233215 A1    Nov. 25, 2004

Related U.S. Application Data

(63) Continuation of application No. 10/113,629, filed on Mar. 27, 2002, now Pat. No. 6,771,274.

(51) Int. Cl.
*G09G 5/02* (2006.01)

(52) U.S. Cl. ....................................... 345/592

(58) Field of Classification Search .............. 345/592, 345/612, 632; 348/110, 276; 358/487, 506; 365/127; 715/902
See application file for complete search history.

(56) References Cited

U.S. PATENT DOCUMENTS

| | | | |
|---|---|---|---|
| 5,581,680 A * | 12/1996 | Sfarti et al. ................. 345/443 |
| 5,912,710 A | 6/1999 | Fujimoto |
| 5,914,725 A * | 6/1999 | MacInnis et al. ............ 345/441 |
| 6,239,815 B1 * | 5/2001 | Frink et al. ................. 345/502 |
| 6,753,870 B2 * | 6/2004 | Deering et al. ............. 345/531 |
| 2002/0001458 A1 | 1/2002 | Abelard et al. |

* cited by examiner

*Primary Examiner*—Matthew C. Bella
*Assistant Examiner*—Gregory F. Cunningham
(74) *Attorney, Agent, or Firm*—Blakely Sokoloff Taylor & Zafman

(57) ABSTRACT

Alpha blending and video blending are both provided by a color definition in an RGBAV format allows for an additional component to control video blending. The V value defines blending of an alpha blended color with a video background.

17 Claims, 5 Drawing Sheets

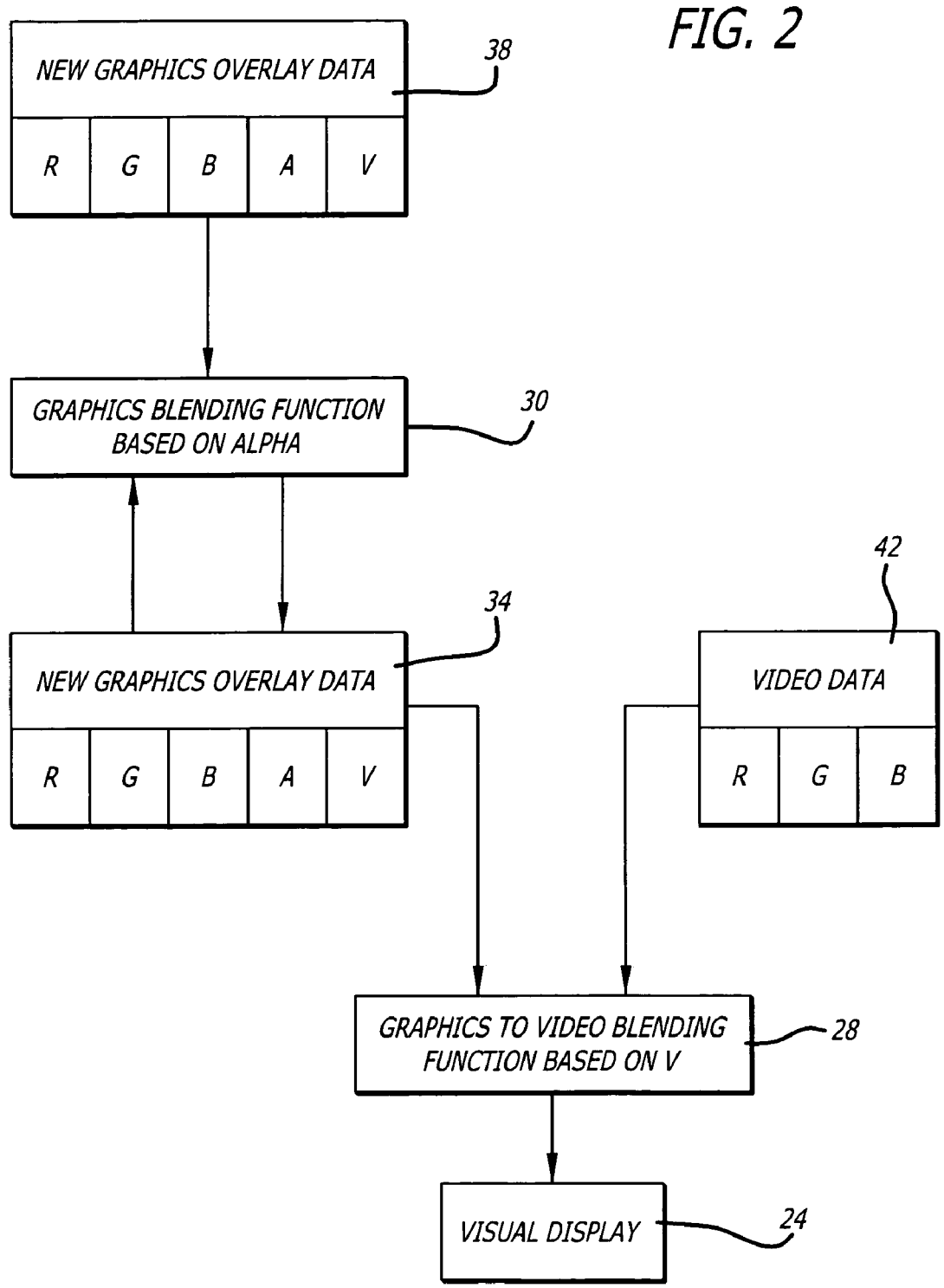

GRAPHICS AND VIDEO INTEGRATION WITH ALPHA AND VIDEO BLENDING

This application is a continuation of application Ser. No. 10/113,629, filed Mar. 27, 2002 now U.S. Pat. No. 6,771,274.

FIELD OF THE INVENTION

The present invention relates to graphics overlay for video data providing independent blending control for how graphics pixels are blended together from how graphics pixels are blended with the background video.

BACKGROUND OF THE INVENTION

A function of increasing importance is the simultaneous provision of graphics and video on a display. The video and graphics may be provided in a number of different contexts, whether through multimedia distribution systems, combined computer and television functions or video games. Current application program interface (API) definitions for three-dimensional graphics specify a color definition utilizing four components, red, green, blue and alpha. The red, green and blue components represent actual color, and alpha represents a blending factor which indicates a level of transparency. One use of alpha blending, for example, is to represent a vehicle interior as seen through a car windshield. Pixels representing points in areas of polygons modeling a car would have the alpha representing the windshield set to an intermediate value, while polygons representing the vehicles interior would have alpha values set to make them appear opaque. There is also the case of blending with the background color or background image if there are no polygons underneath a particular pixel in the windshield. The case of additional transparent polygons underneath the windshield is also possible.

Alpha blending is a well-known technique for providing transparency information for transparent or translucent objects. In alpha blending, a resultant color of a pixel is a combination of a foreground color, i.e., the color of the translucent object, and a background color, i.e. the color of what is underneath the blended polygon. Alpha blending has been implemented by rendering polygons through a stipple mask whose on-off density is proportional to the transparency of the object, although this technique is rarely used anymore. The most common implementation is to use the alpha value to blend colors on a pixel-by-pixel basis. For greatest convenience in computation, alpha is given as an unsigned integer value in the range of 0 to 255 for each color pixel. A new pixel equals $((\alpha)(\text{pixel A color component})+(1-\alpha)(\text{pixel B color component}))/255$ where A and B are the foreground and background color components respectively. This equation is applied to each individual color component, red, green, blue and alpha resulting in new red, green and blue and alpha components. The capital letters RGBA signal is commonly provided by a 32-bit frame buffer with 24 bits of color, 8 each for red, green and blue and 8 bits for the value of alpha. It is also recognized that there are alternate forms of this blending equation such as $((\alpha+1)(\text{pixel A color component})+(1-(\alpha+1))(\text{pixel B color component}))>>7$. This form of the equation allows a right shift ($>>7$) to replace the divide by 255. A shift operation is executed much more quickly than a divide operation. With many pixels to process this makes the overall processing much faster.

A further graphics capability beyond simple alpha blending may be required in systems where, for example, it is desired to have three-dimensional graphics blended with a video background. The RGBA signal methodology is not robust enough to accommodate both blending of colors of polygons within the rendered 3D image in addition to an independent blending of the information in the rendered image with a video background. The alpha value is used to provide blending for pixel colors and for blending with the background video. There is no way to distinguish whether the blending is to be applied to the pixel color or with the background video. In setting the RGBA values for the above windshield example, the capability is not provided to allow a transparent windshield through which the vehicle interior is seen and in which there is no video blending of the interior with background video. It is not a satisfactory solution simply to add an additional digital word in addition to the digital word representing the color definition RGBA. The common RGBA definition is 32 bits per pixel, or 16 bits per pixel in some systems. These bit lengths already correspond conveniently with current sizes for word-aligned direct memory access (DMA) transfers, word-aligned memory operations and standard bus sizes.

SUMMARY OF THE INVENTION

In accordance with the present invention, color definition is provided which allows for alpha blending and also provides for video blending. Additionally, the ability to maintain a standard color definition length such as 32 bits is maintained. A format called RGBAV is provided which modifies color definition to allow for an additional component to control video blending. A multibit definition is established for pixel color definition including values for red, green, blue, alpha blending and video blending. In one form 8 bits each may be provided for the red, green and blue values with the remaining 8 bits divided between the alpha and video values. Additionally, a specialized processor is provided in which coded RGBAV values are read and in which graphics are processed using the alpha value. The RGBA output is combined with a video or V processing value to provide a composite. The technique used to blend graphics with video is similar to the one explained previously, for example, $((V)\text{graphics}+(131-V)\text{video})/\text{maximum}\_V$ to generate a display pixel color. The same method can be applied to other color formats beyond RGB. For example, these same principles may be applied to YUV encoding.

BRIEF DESCRIPTION OF THE DRAWINGS

The invention, both as to its organization and manner of operation may be understood by reference to the following description taken in connection with the following drawings.

Of the drawings:

FIG. 2 is a block diagram of the information in FIG. 1 illustrating hardware storing the data;

DETAILED DESCRIPTION

Figure 1:
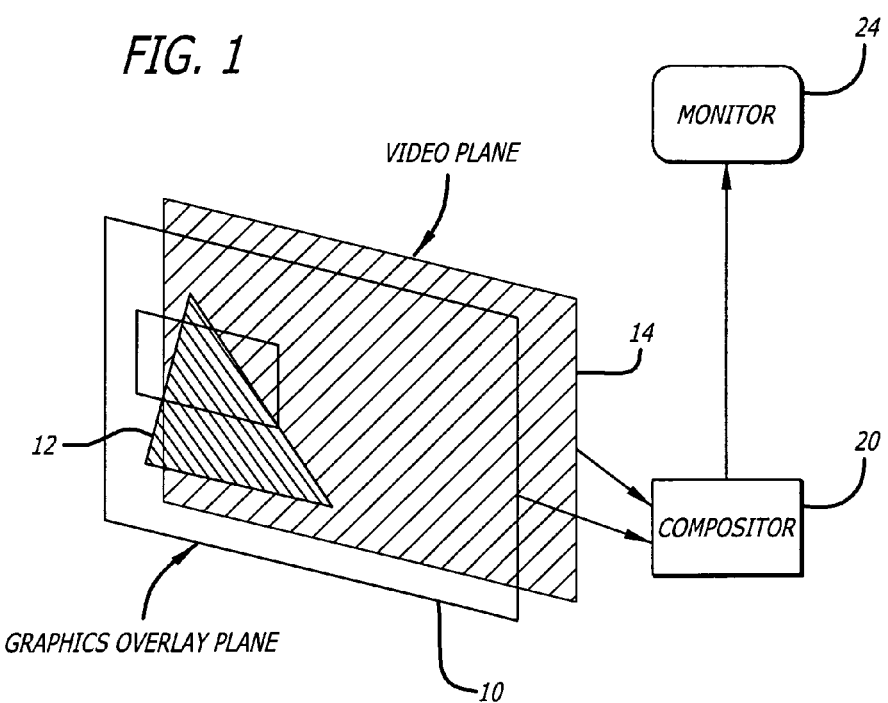
FIG. 1 is a block diagram illustrating graphical and video data to be combined polygons and hardware for blending and displaying blended data.

FIGS. 1 and 2 are each a block diagram to illustrate alpha blending and blending of graphics with video and display of visual data. The same reference numerals are used to denote corresponding components. In the present description, visual data refers to graphics or video. In FIG. 1, the shapes represented by data are illustrated. In FIG. 2, data storage and combining hardware is illustrated. For purposes of the present description, blending of graphics and video, where the graphics may or may not already be alpha blended, is called video blending. Just as a level of alpha blending is represented by the letter A, in the present description video blending levels are represented by V.

As seen in FIG. 1, a rectangle 10 represents a graphics overlay plane to be alpha blended with a polygon 12. The polygon 12 in the present example is a triangle and comprises a component of a three dimensional image rendered for display in two dimensions. The rectangle 10 is unfilled in FIG. 1 to indicate transparency. The polygon 12 is lined for a first color. In prior art graphic displays, the rectangle 10 and polygon 12 can be blended through the use of RGBA signals where the letters stand for red, green, blue and alpha blending respectively. There are applications in which it is desired to superimpose the graphics comprising the rectangle 10 and polygon 12 on a video background 14. In the present example, the video background 14 is lined for a second color. RGBA encoding of values for pixels does not accommodate independent blending of both the polygon 12 with the rectangle 10 and the blending polygon 12 with the video background 14. The use of the video blending level V will permit blending of an alpha blended polygon with the video background 14. Visual data is provided to a compositor 20 to drive a display comprising a monitor 24.

In FIG. 2, the function of the compositor 20 is provided by a graphics blending arithmetic unit 30 and a graphics and video blending arithmetic unit 28. The graphics blending arithmetic unit 30 alpha receives RGBAV data, further described with respect to FIG. 3b, from a register 34 indicative of current data representing the color information of the rectangle 10 that will be alpha blended with a signal indicative of the polygon 12. When the graphics background information for the rectangle 10 changes, update data is provided to the arithmetic unit 30 from an update register 38. Video data representing the video background 14 is supplied from an RGB video data register 42. Graphics and video blending based on the V value is performed in the arithmetic unit 28. Further specific details of graphics and video blending are described with respect to FIG. 5 below.

Figure 3A:
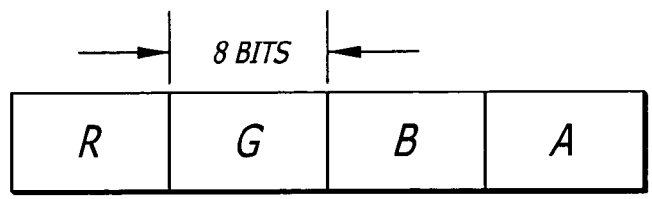
FIGS. 3a and 3b are illustrations of an exemplary multibit word providing RGBA and RGBAV information for a pixel respectively.
Figure 3B:
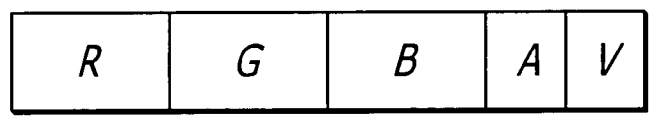

In accordance with the present invention, encoding, a process and a processor are provided for providing both blending operations. FIG. 3a is a representation of the conventional prior art 32-bit representation of a pixel including RGBA components. FIG. 3b represents encoding according to the present invention, providing values for RGBA and V, where V is a video blending value. In the particular example 8 bits are provided for red, green and blue information and 4 bits each are provided for A and V information. However, as is well known in the art, other numbers of bits may be provided. Additionally, further forms of encoding other than RGB may be provided. While most conventional apparatus will utilize equal numbers of bits for the values of R, G and B, this is not a necessity. Other schemes use unequal numbers of bits. Also, color here is denoted by RGB. This term also covers color definitions where RGB may be in a different order or where particular hues are defined by symbols other than R, G and B.

In accordance with the present invention, a multi-component driving signal is constructed comprising first second and third sections, one section containing color information, another section containing alpha blending information, and another section with V blending information. Normally, the driving signal will take the form RGBAV. However, the driving signal could, for example, take the forms AVRGB, VARGB or ARGBV.

Figure 4A:
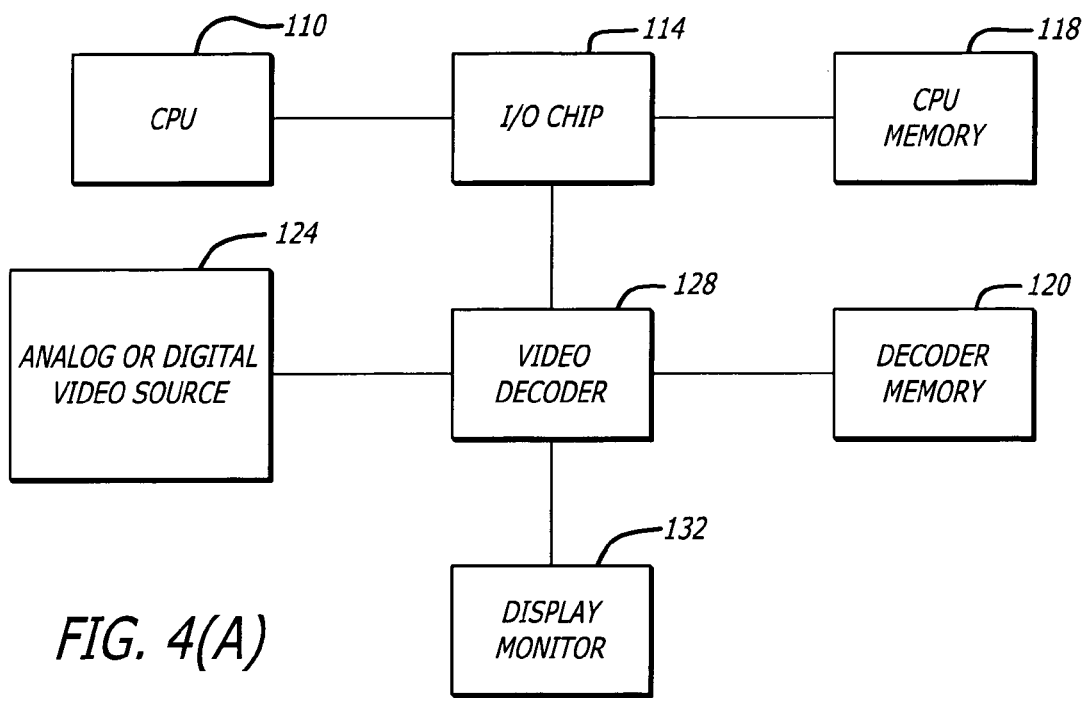
FIGS. 4a and 4b are block diagrams of video graphics systems incorporating the present invention.
Figure 4B:
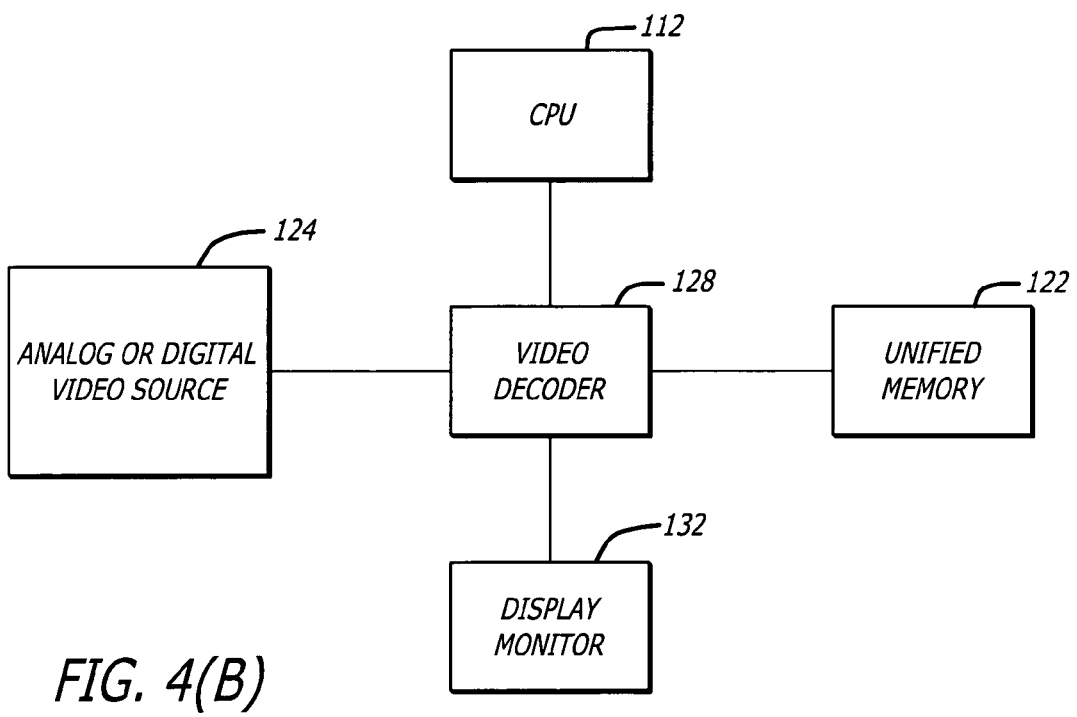

FIGS. 4A and 4B are each a block diagram illustrating a system incorporating the present invention in which the same reference numerals are used to denote corresponding components. In the embodiment of FIG. 4A, a graphics central processor unit (CPU) 110 processes data via an input/output (I/O) interface 114 and utilizes an independent CPU memory 118. A decoder memory 120 contains information indicative of the graphics overlay rectangle 10 and the polygon 12. Information indicative of the video background 14 is supplied from a video source 124. The video source 124 may be analog or digital. In this embodiment, processing required to combine the graphics information and video information is performed in a video decoder 128 which interfaces with both the video source 124 and decoder memory 120. The video decoder 128 provides an output to a display monitor 132. In one form, first register 34 comprises a memory kept within the video decoder 128. The memory provides a signal that is equal to a preselected number of scan lines of video data. In this embodiment, the wherein said memory is continuously re-rendered in a manner synchronous with the scan out of a video display monitor 132.

In the embodiment of FIG. 4B, a CPU 112 interfaces directly with the video decoder 128, which also interacts with a unified memory 122. The unified memory 132 corresponds to the decoder memory 120 and provides memory for the CPU 112. Many other architectures will also suggest themselves to those skilled in the art to provide the form of processing taught herein. One of the many forms that the video source 124 could comprise is a MPEG-2 source and transport. The CPUs 110 or 112 may be included in a set top box and comprise graphical user interfaces.

Figure 5:
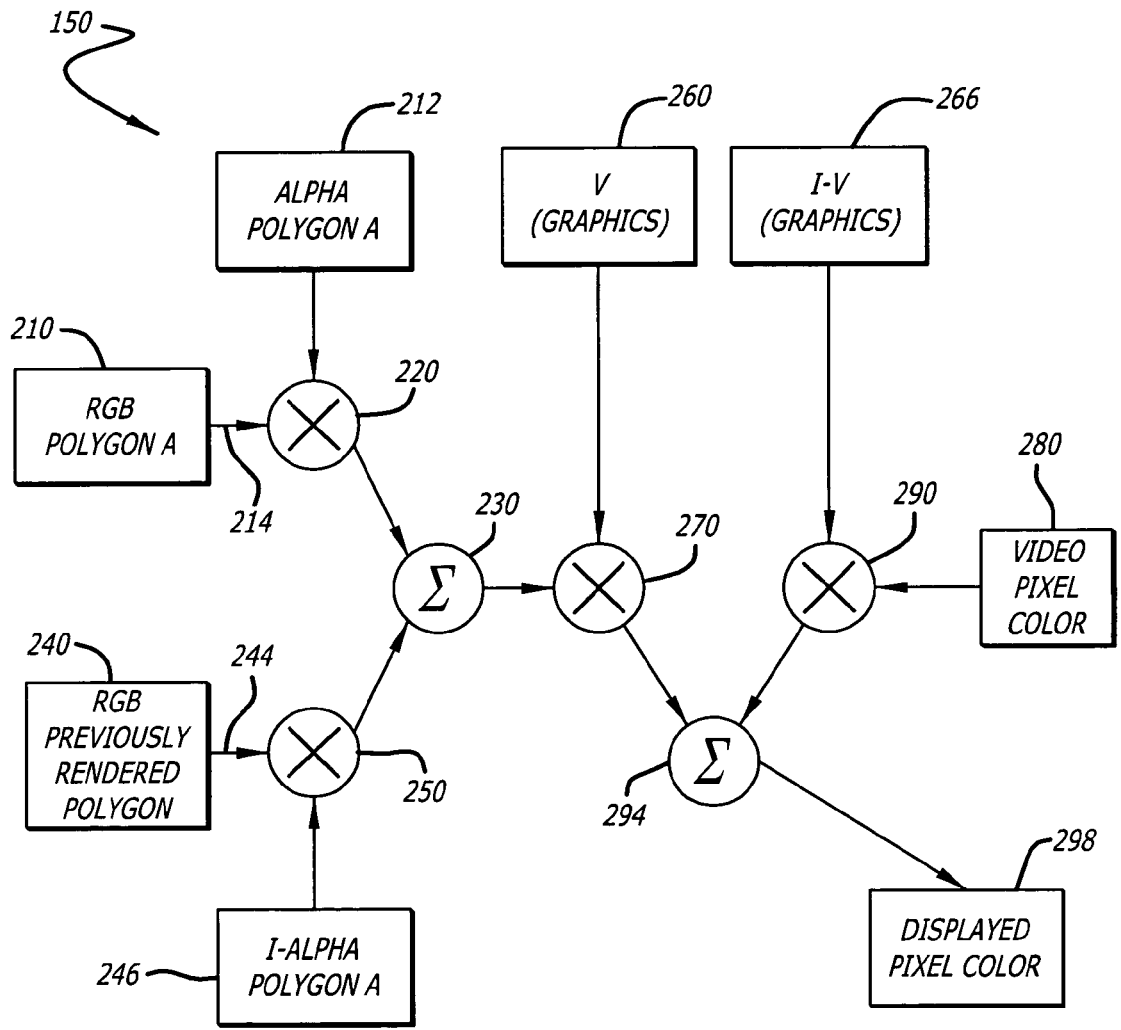
FIG. 5 is a block diagrammatic representation of RGBAV processing in the present invention.

FIG. 5 is a block diagram of a mixer 150 suitable for performing the alpha blending and the V blending within the video decoder 128. For purposes of the present description, the various values to be utilized are attributed to the displayed items in FIG. 1. At block 210, the RGB register for a pixel in the rectangle 10 is illustrated. An intensity output at terminal 214 is provided. The alpha value is provided from a location 212 of the pixel register and supplied to a multiplier 220. The output of the multiplier indicates the color of the pixel to be provided times the blending factor α. The output is supplied to a summer 230. The summer 230 preferably includes circuitry, e.g. scaling registers or resistors, to normalize the blending factor α. More specifically, the summed result is divided by a value corresponding to the size of the maximum alpha value. An RGB value for a corresponding pixel in the polygon 12 is stored in a register 240 and provided at an output terminal 244. For blending purposes the color to be provided for the polygon 12 is multiplied by 1−α, stored in register location 246. The output from the terminal 244 is multiplied by 1−α in a multiplier 250. The multiplier 250 provides a second input to the summer 230.

After corresponding pixels in the rectangle 10 and polygon 12 have been blended. It is necessary to combine with the corresponding pixel from the video display 14. A value V in a register 260 represents the degree of blending by which the graphics will be multiplied. The output of the summer 230 is multiplied by V at a multiplier 270. The video, whose pixel information is stored in a register 280 is to be multiplied by 1−V, which is stored in a location 266 and is the ones complement of the value V. The video pixel value is multiplied by 1−V at a multiplier 290. The outputs of the multipliers 270 and 290 are combined at a summer 294. As with the α value, it is preferable to normalize the V value. The summer 294 divides the summed result by a value corresponding to a maximum value of V. The summer 294 produces an output to drive a pixel at pixel driver location 298.

Figure 6:
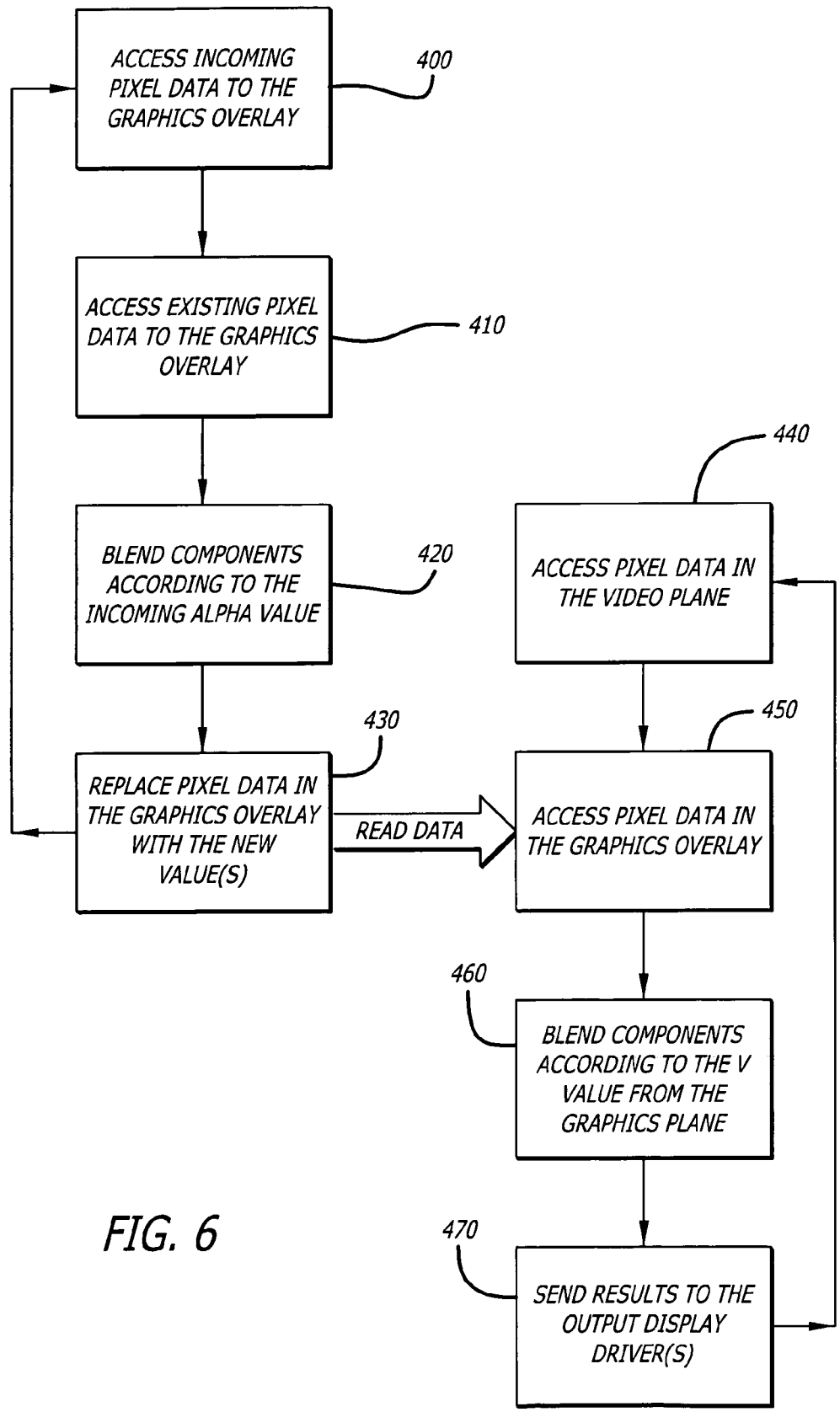
FIG. 6 is a flow chart describing the method and machine-readable medium of the present invention.

FIG. 6 is a flow diagram illustrating the operation and the method of the present invention. At block 400, incoming graphics information, such as the new graphics overlay data in register 38 of FIG. 2 is accessed. At block 410, existing pixel data, such as data in the register 34 of FIG. 2 is accessed. At block 420, blending of background information, such as at arithmetic unit 30 is performed. New RBGA information is produced which, at block 430 becomes the new currently existing graphics overlay data in register 34. The new RGBA information is available for access at block 400 of a next operating cycle.

In preparation for a next blending operation, at block 440, the video information for the background 14 is accessed, as from the data register 42 and made available to the arithmetic unit 28. At block 450, the new overlay value is obtained from the register 38, and at block 460, the arithmetic unit 28 blends components according to the value V. At block 470, the blended result is provided to display drivers. The correct displayed pixel color is thus provided at the desired intensity and blending.

The specification has been written to enable those skilled in the art to make many departures from the specific embodiments disclosed to produce a method and apparatus in machine-readable medium in accordance with the present invention.

What is claimed is:

1. A method for blending an alpha blended signal with visual data comprising encoding a pixel to form a plurality of bits including a first plurality of bits representing color values, a second plurality of bits representing an alpha blending value and a third plurality of bits representing a blending value for blending the alpha blended value with the visual data.

2. The method according to claim 1 further comprising dividing said plurality of bits into components including a red color value, a green color value, a blue color value, an alpha-blending value and a video blending value.

3. The method according to claim 1, wherein the second plurality of bits and said third plurality of bits are of equal length.

4. The method according to claim 1, wherein prior to encoding the pixel, the method further comprising producing said plurality of bits being a 32-bit word.

5. The method of claim 1 wherein prior to encoding the pixel, the method further comprising producing said plurality of bits being a 16-bit word.

6. The method of claim 1 wherein the visual data is video.

7. The method of claim 1, wherein the visual data is a video background.

8. A machine-readable medium that provides instructions which, when executed by a processor, causes said processor to perform operations comprising:
accessing a first signal including an alpha blended signal;
accessing a second signal including a video background; and
video blending said first and second signals in accordance with a video (V) value.

9. The machine-readable medium of claim 8, wherein the video blending comprises multiplying an alpha blended output by the V value to produce a first result, multiplying a video pixel color by the ones complement of the V value to produce a second result, and summing the first result and the second result to provide a display pixel color.

10. The machine-readable medium in accordance with claim 8, wherein prior to accessing a first signal including an alpha blended signal, the method further comprising accessing said alpha value and V value from a register.

11. The system of claim 8, wherein the video blending includes blending of (i) the alpha blended signal being a graphics image blended using an alpha value and (ii) the second signal being the video background to generate a display pixel color.

12. A system comprising:
means for storing an alpha blending value and a video blending value; and
means for encoding a pixel to form a bit representation including a first plurality of bits representing color values, a second plurality of bits representing the alpha blending value and a third plurality of bits representing the video blending value for blending the alpha blended value with a signal including visual data.

13. The system of claim 12, wherein the means for encoding including a video processor.

14. The system of claim 12, wherein the second plurality of bits and the third plurality of bits are of equal length.

15. The system of claim 12, wherein the first plurality of bits is equal in size to a sum of the second plurality of bits and the third plurality of bits.

16. The system of claim 12, wherein the signal including visual data is a video signal.

17. The system of claim 12, wherein the visual data is a video background.

* * * * *